United States Patent [19]

Johnson et al.

[11] Patent Number: 5,702,603
[45] Date of Patent: Dec. 30, 1997

[54] SELF-SEALING LIQUID FILTER

[76] Inventors: Todd W. Johnson; David G. Fabio, both of P.O. Box 33427, St. Paul, Minn. 55133-3427

[21] Appl. No.: 620,979

[22] Filed: Mar. 22, 1996

[51] Int. Cl.$^6$ ............................................. B01D 27/06
[52] U.S. Cl. .......................... 210/493.1; 210/493.5; 210/497.01; 156/218; 55/497; 55/521
[58] Field of Search .................... 210/493.1, 493.2, 210/493.5, 497.01, 497.1; 156/218, 474; 55/497, 500, 521

[56] References Cited

U.S. PATENT DOCUMENTS

| | | | |
|---|---|---|---|
| 426,945 | 4/1890 | Maigen . | |
| 1,928,049 | 9/1933 | Danills | 210/169 |
| 2,186,440 | 1/1940 | Williams | 210/169 |
| 2,556,521 | 6/1951 | Chase | 210/169 |
| 2,732,951 | 1/1956 | de Magondeau | 210/169 |
| 2,933,192 | 4/1960 | Gretzinger | 210/316 |
| 3,087,623 | 4/1963 | Gewiss | 210/493 |
| 3,219,191 | 11/1965 | Suchy | 210/266 |
| 3,329,276 | 7/1967 | Mouwen | 210/487 |
| 4,154,688 | 5/1979 | Pall | 210/487 |
| 4,594,162 | 6/1986 | Berger | 210/493.1 |
| 4,678,578 | 7/1987 | Nodes et al. | 210/445 |
| 4,842,739 | 6/1989 | Tang | 210/489 |
| 4,877,527 | 10/1989 | Brownell | 210/489 |
| 4,938,869 | 7/1990 | Bayerlein et al. | 210/437 |
| 5,582,907 | 12/1996 | Pall | 428/287 |

FOREIGN PATENT DOCUMENTS 0 197 692 A1  3/1986  European Pat. Off. .

*Primary Examiner*—W. L. Walker
*Attorney, Agent, or Firm*—Gary L. Griswold; Walter N. Kirn; William J. Bond

[57] ABSTRACT

There is provided a liquid filter formed of a pleated filter material or laminate where the pleat folds are closely adjacent such that they are separated by less than 6 mm. The downstream pleat tips are supported by a rigid support structure of an open porous lattic or the like. Between the downstream pleat tips and the rigid support structure is a self-sealing fibrous cover layer having an effective mean flow pore size (MFPS) greater than the effective MFPS of the pleated filter material.

27 Claims, 4 Drawing Sheets

SELF-SEALING LIQUID FILTER

The present invention relates to high surface area liquid cartridge filters operating at relatively high pressure-drops.

A common method for maximizing effective filter area in a predetermined space is to take a known filter media and subject the filter media to a pleating operation. The pleats in the filter media are subsequently stabilized into a, e.g., zig-zag form by a number of methods. This pleating allows a filter manufacturer to increase effective filtration surface area versus a flat filter in the same predetermined space.

With most pleated filter arrangements the filter media pleat structure is maintained relatively open. The pleats are formed of a series of pleat sections with inner and outer faces. The adjacent pleat sections are joined at fold lines. The filter media is maintained open by the pleat faces on adjoining or adjacent pleat sections not being in substantial contact, i.e., they diverge from one pleat fold to the two adjacent pleat folds on the opposite face of the pleated filter. This spacing is accomplished by use of spacers, rigid supports, rigid frame elements and the like. This open pleat structure is generally considered important when the fluid being filtered is a low viscosity fluid, such as a gas. However, the use of rigid supports, pleat spacers or the like also decreases the effective number of pleats per unit area that can be obtained. Additionally, with annular cartridge-type filters, maintaining proper pleat spacing is a complicated task requiring the use of annular spacing elements and/or complex manufacturing techniques.

The use of rigid paper to form an annular-type pleated filter media arrangement is described, for example, in U.S. Pat. Nos. 2,732,951; 3,329,276; 2,933,192 and 2,556,521. However, the use of rigid paper provides a filter which is generally unacceptable for aqueous filtration applications. Generally, resin impregnation is used to provide sufficient rigidity for a functionally stable filter media. However, resin impregnation typically decreases effective pore size reducing filtration efficiency and increasing pressure drop across the filter.

U.S. Pat. No. 3,087,623 describes a pleated filter arrangement where a large number of rectangular strips (or one continuous strip) of filtering material, such as paper or fabric, are folded in an annular fashion and stacked one upon another. Folding a rectangular strip into an annular shape, where the diameter increases radially outwardly, creates pleat folds which decrease in depth from the interior center portion of the annular filter to the outer portion, where the annular filter material is substantially flat. Forming a filter in this manner requires that the stacked strips of filter material be sealed off by fluid tight shims, or that the layers be glued together, to prevent bypass between the stacked annular rings of pleated filter material. This decreases filtration performance and makes the manufacturing process quite difficult.

Efforts to increase the density of pleats per unit length in a liquid cartridge filter are described in U.S. Pat. Nos. 4,594,162 and 4,842,739. The 4,594,162 patent describes a method for pleating an annular filter material that is sandwiched between fiber tows. The laminate of the filter material and fiber tows is conveyed by air into a conveyor with an annular passage. In a section of the annular conveyor passage, the conveying gas is vented. At this venting location in the conveyor passage the laminate filter material progress is stalled causing random radial pleating of the annular filter material laminate. Generally, the pleated filter material is withdrawn from the annular conveyer tube at a much lower speed than the unpleated filter laminate is fed into the annular conveyor. The annular pleated form of the filter material is maintained by heat setting the pleated material. The tow fabric, generally yarns or fibers, is used to provide pleat spacing between adjacent pleat structures of the filter material. The resulting pleat structure has a large number of pleats per linear length.

U.S. Pat. No. 4,842,739 describes a method for similarly forming an annular radially pleated filter material, which is provided in preferred arrangements with an inner or outer rigid porous support tube for high-pressure liquid filtration applications. Like the pleated filter of U.S. Pat. No. 4,594,162, this patent produces a radially pleated filter from an annular filter material which filter has a large number of pleats per linear inch. The filter is pleated with an embossed structure on the annular filter material. This embossed structure, among other things, creates a secondary pleat structure on and between the annular pleat sections forming the radial pleated structure. It was found that this filter arrangement provided extremely high particle loading capacity in relatively high pressure drop liquid filtration applications without the filter media collapsing or prematurely blocking due to a compacted particle cake. The pleat structures are generally self-supporting. However, during the filtration operation the build-up of a fine porous particle cake on the upstream face of the pleated filter media gradually increases pressure drop over the operating life of the pleated filter. This pressure build-up in certain cases causes rupture of the filter media at downstream pleat tips often resulting in premature failure of the filter (i.e., before the filter pressure drop increases beyond tolerable levels for the operating equipment).

The present investigator was directed at providing a method of addressing this premature pleat tip failure problem without adversely impacting filtration performance or filter life. However, the invention is generally concerned with the problem of pleat tip rupture for all liquid filters with closely spaced or contacting pleat section faces and specifically to this problem in liquid cartridge filters as described above.

BRIEF SUMMARY OF THE INVENTION

Figure 1:
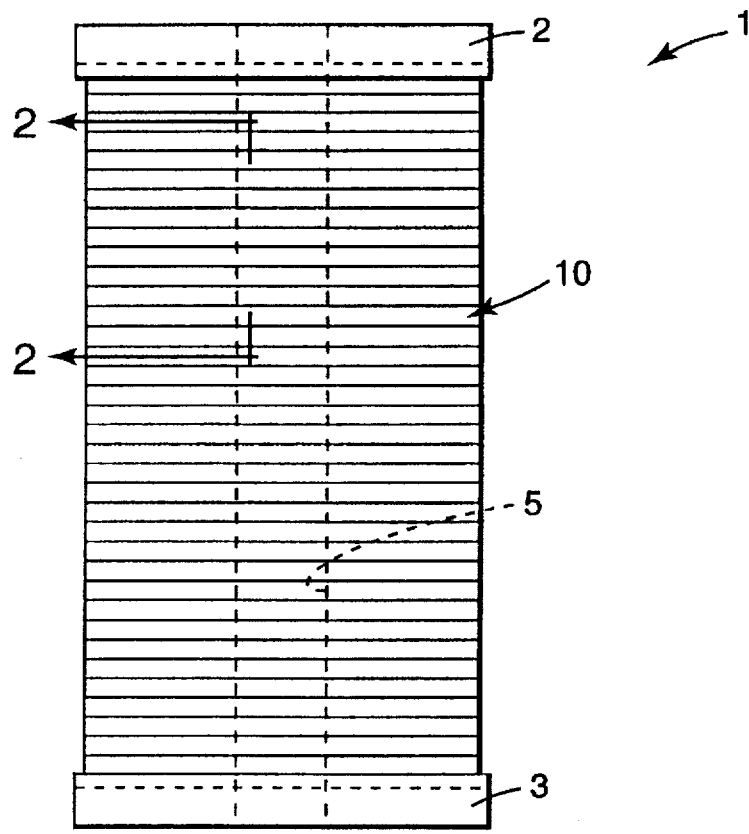
FIG. 1 is a side view of a cylindrical cartridge filter in accordance with a first embodiment of the invention.

There is provided a liquid filter for filtering particles from a liquid. The filter comprises a pleated filter material or filter material laminate. The pleated filter material or laminate has an upstream face and a downstream face with a rigid support structure on the downstream face. The pleated filter material or laminate has upstream and downstream pleat tips separated by pleat sections of the filter material. The filter material also has upstream and downstream faces where the upstream and downstream faces of the filter material on adjacent pleat sections, between the upstream and downstream pleat tips, are separated by 6 mm or less on average. The downstream pleat tips form the downstream face of the pleated filter material. These downstream pleat tips are in generally continuous contact with a porous self-sealing fibrous cover layer which self-sealing fibrous cover layer performs essentially no filtering function. The cover layer in turn is in continuous contact with the rigid support structure. The self-sealing cover layer functions to stop liquid flow through the filter in the area adjacent to where a pleat or pleat tip ruptures.

DETAILED DESCRIPTION OF THE PREFERRED EMBODIMENTS

An advantage of a pleated filter media is the large available surface area on which particles can deposit. A large filtration surface area also allows the particles to spread out rather than forming a deep cake of particles, which would tend to restrict the flow of liquid through the filter media. A large filtration surface area also provides for low velocity of the liquid being filtered as it traverses the filter media. Low velocity filtration favors formation of a permeable rather than hard packed particle cake, allowing for higher particle loading per unit area without developing excessive restrictions to liquid flow.

In general, the invention pleated filter media is made with thin nonwoven or woven fibrous filter material of about 10 to 300 g/m² basis weight, preferably 20 to 150 g/m². The lower basis weight filter material allows for a large number of pleats for a given unit length. A filter material with a basis weight below 10 g/m² would not have sufficient filtration efficiency and integrity for most practical liquid filter applications.

The filter material is preferably non-rigid and/or not impregnated with significant amounts of resin or the like. The filter material can be joined to cover layers on the upstream and/or downstream faces. However, these cover layers should preferably be more permeable than the filter material so that it does little or no particle filtration. In addition, fluid distribution layers (18, 19) can be used on either the upstream and/or downstream faces of the filter material layer or layers (10). The fluid distribution layer(s) can also serve to provide minimal separation between the filter material or laminate on opposing pleat faces of adjacent pleat sections. The distribution layers can be fiber tows, nonwoven webs, woven webs, laminated fiber webbing or the like. Generally, these distribution layers are very open and formed of large average diameter fibers (e.g., 10 to 10,000 denier, preferably 20 to 600 denier). The distribution layers can have a thickness of from 0.1 to 2.0 mm, preferably 0.2 to 1.0 mm and preferably will compress by less than 20 percent under 2.5 bar pressure at 9 m³/hr liquid flow.

The flow restrictions across the pleated filter media, generally due to the permeable cake of particles formed on the filter media, tends to rise exponentially over the time the filter is in service. Close to the end of the useful life of a pleated filter, the rate of increase in pressure-drop due to flow restrictions can be so rapid users can fail to remove the filter cartridge before exceeding the maximum recommended differential pressure. The combination of a thin filter material and large hydraulic forces at this stage in a filter's life can cause problems in pleated liquid filters, particularly at the downstream pleat tips. The liquid pressure forces tend to concentrate at the downstream pleat tips often resulting in the downstream pleat tips rupturing. The invention filter design is addressed at reducing or eliminating this problem by providing a downstream self-sealing layer that essential seals the filter off in those areas where a pleat tip has ruptured or liquid break-through has occurred in the pleated filter material.

FIG. 1 illustrates a pleated filter cartridge 1 for liquid filtration in accordance with the invention where a large number of stacked radial pleats in a single annular filter material are provided using pleating techniques such as those disclosed in U.S. Pat. No. 4,842,739 or U.S. Pat. No. 4,594,162. The cartridge filter 1 is shown as provided with a central support core 5. Central support core 5 generally is a rigid support structure which is porous (e.g., having a nominal pressure drop less than 0.1 bar at 9 m³/hr liquid, and average discrete open areas of at least 5 percent, preferably at least 20 percent), such as a screen, a rigid netting or the like. The central support core 5 prevents radial collapse of the pleated annular filter under high pressure liquid filtration applications. In this embodiment the fluid is flowing from an outward surface in towards the support structure 5 under pressures ranging from 0.3 bar to 4 bar at 9 m³/hr liquid flow.

In the prior art the downstream pleat tips 16 of the pleated filter material 10 generally sits or rests directly on the support core 5. In the invention filter, the downstream pleat tips 16 rest on the self-sealing layer 20 which self-sealing layer 20 is wrapped around the rigid support core 5. The downstream pleat tips 16 are generally in intimate continuous contact with the self-sealing layer 20 along the full length of the pleat tip 16 adjacent the support core 5.

The filter cartridge 1 of FIG. 1 would be placed in a conventional filter housing(not shown) where liquid is supplied under pressure at the outer face of the annular filter cartridge flowing inward towards the central support core 5 and axially outward through ends 2 and/or 3 of the filter cartridge 1. Such cartridge-type filters are well known in the art and are disclosed, for example, in U.S. Pat. Nos. 4,938,869 and 4,877,527.

Figure 2:
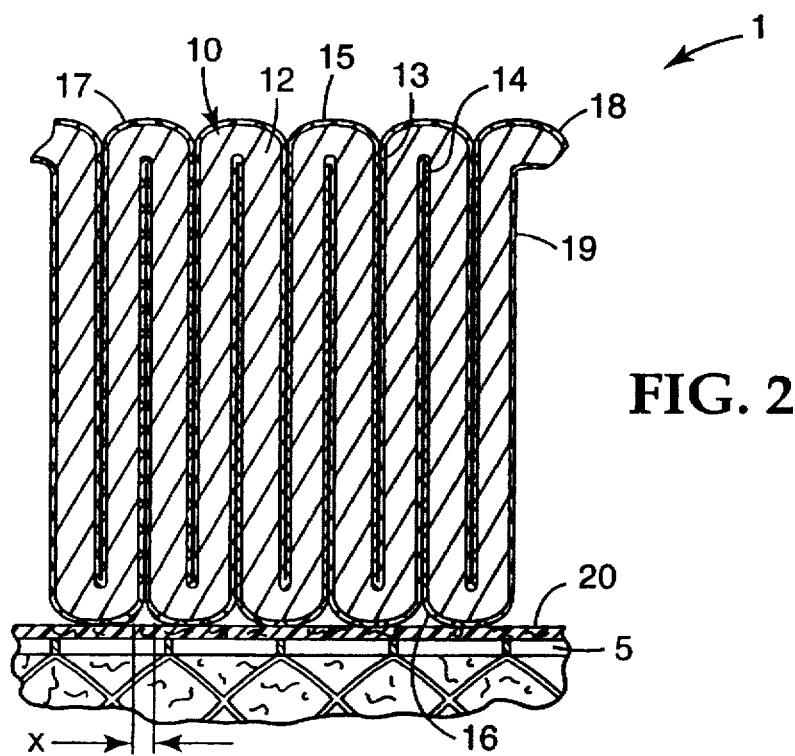
FIG. 2 is a cutaway view of the FIG. 1 filter.

FIG. 2 illustrates a cross-section of a pleated filter material, such as in the annular filter cartridge of FIG. 1, showing the highly compacted filter pleats 15 of the filter material 10 having upstream pleat folds 13 and downstream pleat folds 14. Generally, during the course of filtration, a particle-loaded liquid impacts the pleat fold 15 structure on the upstream face pleat tips 17 and is forced in between the upstream pleat folds 13 exiting along the pleat faces of the downstream pleat folds 14 and/or at the downstream pleat tip 16. As the filtration operation proceeds a cake of particles develops and thickens on the surface of the upstream pleat folds 13 which slowly compresses the filter material 10. The particle cake also increases the pressure drop across the filter. Forces from this increase in pressure-drop appear to concentrate at the downstream pleat tips 16 which results in the problem of pleat tip rupture, which consequently results in filter failure. This failure can go undetected in some filtration systems where filters are changed based on a preset terminal pressure drop, if this preset terminal pressure is above the pressure drop where the pleat tip(s) ruptures. This is because after pleat tip rupture, a filter can fail to show further increases in pressure drop due to unfiltered liquid bypassing the filter material at the, e.g., ruptured pleat tips.

Unexpectedly, it was found that by providing a non-filtering fibrous cover layer 20 over the support core 5 that the above problems with pleat tip failure can be substantially eliminated. While not wishing to be bound by theory, it is believed that the non-filtering fibrous cover layer 20 provides additional uniform support for the pleated filter material at the downstream pleat tips 16 reducing the tendency for stress concentrations to occur at specific locations of the downstream pleat tips 16. With reduced stress concentrations there is less of a tendency for the pleat tips to fail by rupturing. Further, if there is a rupture in a downstream pleat tip 16 the fibrous cover layer almost instantaneously becomes clogged with particles dislodged in the area adjacent the rupture and carried in the liquid stream, essentially sealing off the area of the filter around the pleat tip rupture. The fibrous cover layer 20 as such acts as a self-sealing layer.

The self-sealing fibrous cover layer 20 is generally a fibrous woven or nonwoven material which should perform essentially no filtering function during the normal operation of the filter. All the filtering should be performed by the pleated filter material 10.

If the fibrous cover layer 20 removed any substantial portion of the particles in the liquid being filtered, during the normal filtration operation of the filter, this layer 20 would very quickly become blocked with particles. This would cause an increase in the pressure drop to unacceptable levels and prematurely shortening the life of the filter. Rapid plugging would occur in part due to the very small relative surface area (e.g., 1/50th or less that of the filter material 10) that the cover layer 20 represents compared to the overall filter surface area of the pleated filter material 10 (e.g., if the cover layer 20 has 1/100th of the surface area of the pleated filter material 10 and only removes 2 percent of the particles it would build a particle cake twice as fast as the filter material causing premature filter failure).

Further, the liquid flux through a given area of the self-sealing cover layer 20 is generally many times greater than the liquid flux through a given area of the pleated filter material. This would tend to rapidly compact any particle cake that forms on the cover layer 20, causing even more rapid filter failure. As such, substantially all the particle filtering must be done by the pleated filter material 10 prior to the liquid reaching the self sealing fibrous cover layer 20. Generally, this is accomplished by the self-sealing fibrous cover layer 20 having a mean flow pore size (MFPS) greater than the MFPS of the filter material 10. However, as the MFPS of the filter material 10 generally decreases over the useful life of the filter, due to a build-up of particle cake over the surface of the filter material 10, in some cases the self-sealing fibrous cover layer 20 can have a slightly smaller MFPS than the initial MFPS of filter material 10 alone if the effective MFPS due to the buildup of the particle cake rapidly becomes less than the effective MFPS of the cover layer 20. This generally depends on the particle size distribution of the particles in the liquid being filtered. Generally, the fibrous cover layer 20 has an average pore size or MFPS greater than the MFPS of the filter material 10, preferably the cover layer 20 MFPS is at least 20 percent greater than the MFPS of the filter material 10 and preferably at least 50 percent greater than the MFPS of the filter material 10. In any event in use, the MFPS of the fibrous cover layer 20 should be less than the diameters of the largest particles in the liquid being filtered. Generally, the MFPS of the fibrous cover layer 20 is less than 200 percent greater than the MFPS of the filter material 10, preferably less than 100 percent greater.

The filter material 10 can be any conventional filter material such as woven fabrics or nonwoven webs, paper, particle-loaded fabrics and webs, semi-permeable or permeable membranes or porous expanded metal structures or the like. Generally, the filter media thickness is from 0.05 to 2 mm under compression, preferably 0.1 to 0.5 mm. The filter material can be combined with supporting cover webs or prefilter webs in any number of layers forming a filter material laminate. Preferably, the filter material is a nonwoven material, such as a carded nonwoven web, a lofty spunbond web or a melt-blown nonwoven web, which may or may not be subjected to a charging process. Melt-blown nonwovens are well-known in the art and prepared from thermoplastic polymers capable of being melt-blown such as polyethylene, polypropylene, polyesters, nylons or the like.

Suitable self-sealing cover layers can like-wise be formed of nonwoven or woven webs such as spunbond webs as discussed above. The self-sealing cover layer can also be a nonwoven or woven filter material such as the filter material 10. This filter material can then be further laminated to a suitable support or cover web layer as required to make a laminate form of the self-sealing cover layer 20. Preferably the self-sealing cover layer 20 is formed with a fibrous woven or nonwoven material having sufficient strength to withstand the concentrated forces created by the liquid when a pleat rupture event occurs, generally the fibrous cover layer should have a tensile strength of at least 10 Newtons, preferably at least 30 Newtons up to 100 Newtons or more. Preferred materials for the self-sealing cover layer would include spunbond or calendar bonded or otherwise strengthened porous thermoplastic nonwoven materials or laminates including high strength wovens or nonwoven webs. Generally, the self-sealing cover layer is compressible or is otherwise formed of layers which do not create significant gaps between the downstream pleat tips and the self-sealing cover layer. As such, a cross-laminated support scrim of large diameter fibers would not function well as the self-sealing cover layer.

The filter material or a filter material laminate can be pleated in accordance with the methods taught in U.S. Pat. Nos. 4,842,739 or 4,594,162 to produce the radial pleat structures shown in FIG. 1. Alternatively, the radial pleats can be formed by other conventional methods. However the pleats are formed, the pleat folds should be very closely adjacent such as shown in FIG. 2. Adjacent pleats 15, of the filter material 10 or the filter material with any cover layer(s), are either in substantial contact as shown in FIG. 1 or separated, e.g., with a fluid distribution layer (18 and 19) or other structures, by an average spacing of less than about 6 mm, preferably less than 3 mm. If the pleat faces of the pleat folds (13 and 14) are separated so that they do not contact each other or have an average spacing of greater than 8 to 10 mm the self-sealing cover layer becomes ineffective. This is due to the fact that a failure at one pleat tip 16 would expose a much larger area of the filter cover web layer 20 to liquid resulting in a larger period before self-sealing occurs and/or self-sealing off an excessively large area of the filter cross-sectional surface area, which could result in effective filter failure.

Although the invention is exemplified with respect to a filter cartridge having a central support core 5, a peripheral support on the larger outer annular face of a cylindrical cartridge filter could also use a self-sealing layer in accordance with the invention. For a cartridge filter of this construction the liquid would have a radially outward flow from the center to the periphery of the cartridge filter.

In another embodiment of a cartridge filter, the pleats of the filter material can be arranged to extend along the length of the filter rather than radially for either an inward or outward liquid flow. In this embodiment, the pleated filter material could be formed from a planer filter material. The longitudinal ends of the pleated filter would be joined to each other or one or more holding elements (not shown) to create a liquid tight seal around the ends of the pleated rectangular filter so that there is no liquid by-pass around the pleated filter material. In this embodiment, a filter cartridge can be an annular shape as in the FIG. 1 embodiment or planar, curved or any other shape as long as in the longitudinal direction (i.e. the direction parallel with the pleats) the longitudinal extents or lengths are substantially parallel with each other. As with the FIG. 1 embodiment the filter material should be closely adjacent or in contact along opposing pleat faces of the pleat folds.

In the FIG. 1 embodiment the cartridge filter preferably has an annular shape with substantially parallel linear extents in the direction transverse to the radial pleats (i.e., in the direction that the annular material is pleated). With radial pleat structures these parallel transverse extents could be curved (non-linear, e.g., an annular shape that increases and/or decrease in diameter) and in certain circumstances the extents could be nonparallel (e.g., a converging or diverging shape such as a cone), however such shapes are not likely to be of any functional advantage and would be very difficult to manufacture.

The annular cartridge filter of FIG. 1 has a cross-section which is preferably circular for ease of manufacture and use as well as providing regular pleat spacing, structure and performance. However, other annular cross-sections are possible such as polyhedral, rectangular, wave-shaped or irregular. A central circular core such as shown in FIG. 1 is particularly preferred as it provides for the most advantageous pleat spacing and structure and uniform filter performance. In this embodiment the primary pleats are most closely spaced on average adjacent the support on the downstream face of the filter with the pleats opening slightly from the downstream to upstream faces of the pleated filter material.

COMPARATIVE EXAMPLES

Four annular filter materials were formed using the sample A, B, C and F (Table 1) melt-blown polypropylene filter media by combining two layers of the A and C filter material and one layer of the sample B filter material with spunbond backing and facing layers (17 gm/m² Celestra™ and 55 gm/m² Typar™, respectively). All the filter media, A through E, are melt-blown polypropylene filter media. The laminates of filter materials A through C and F, spunbond/filter material/spunbond laminates, were then formed into an annular form by welding two longitudinal side edges together. The annular filter material laminate was then formed into radially pleated filter using a method similar to that described in U.S. Pat. No. 4,842,739. The cartridge filters of Examples 1 through 3 and 5 using the radially pleated filter material were approximately 1 meter long and 16.6 cm in diameter.

In Example 4 the filter media E was directly formed on a spunbond support web (Typar™ 55 gm/m² basis weight). The combined basis weight of the melt-blown filter media and the spunbond web was about 80 gm/m². The filter media was combined with ROF netting (available from Nalle Corporation) on both faces and formed into a radial pleated filter of the same dimensions as Examples 1 through 3 and 5. The MFPS's for filter media A through F were measured on a Courtlier Porometer (No. 9902284 obtained from Coulter Electronics, Inc., Hialeah, Fla.). Initial particle removal efficiencies for the Example 1 through 5 filter cartridges are set forth in Tables 3 through 7. Examples 1 through 5 are comparative examples of cartridge filters without the invention self-sealing cover layer(s) over the central rigid support core.

TABLE 1

| Sample | Basis Weight (g/m²) | Thickness (mm) | Void Fraction (%) | MFPS (μ) |
| --- | --- | --- | --- | --- |
| A | 20 | 0.23 | 90 | 9 |
| B | 80 | 0.23 | 60 | 2.7 |
| C | 20 | 0.23 | 90 | 20.0 |

TABLE 1-continued

| Sample | Basis Weight (g/m²) | Thickness (mm) | Void Fraction (%) | MFPS (μ) |
| --- | --- | --- | --- | --- |
| D | 20 | 0.23 | 90 | 8.4 |
| E | 25 | — | — | 34 |
| F | 20 | 0.23 | 90 | 26 |

TABLE 2

| Example | Filter Media | Surface Area (m²) |
| --- | --- | --- |
| 1 | A | 20 |
| 2 | B | 19 |
| 3 | C | 20 |
| 4 | E | 8 |
| 5 | F | 20 |

TABLE 3

Example 1

| Particle size - microns | Particle Removal Efficiency |
| --- | --- |
| 1 | 50.0% |
| 2 | 89.4% |
| 3 | 94.2% |
| 4 | 95.8% |
| 5 | 97.8% |
| 6 | 99.2% |

TABLE 4

Example 2

| Particle size - microns | Particle Removal Efficiency |
| --- | --- |
| 0.7 | 66.7% |
| 0.9 | 89.1% |
| 1.1 | 97.5% |
| 1.3 | 99.4% |

TABLE 5

Example 3

| Particle size - microns | Particle Removal Efficiency |
| --- | --- |
| 2 | 50.0% |
| 4 | 66.6% |
| 6 | 81.5% |
| 8 | 93.0% |
| 10 | 98.3% |
| 12 | 99.4% |

TABLE 6

Example 4

| Particle size - microns | Particle Removal Efficiency |
| --- | --- |
| 14 | 49.1% |
| 22 | 73.8% |
| 30 | 87.1% |
| 38 | 94.8% |
| 46 | 97.6% |
| 54 | 98.2% |

TABLE 6-continued

Example 4

| Particle size - microns | Particle Removal Efficiency |
|---|---|
| 62 | 98.4% |
| 70 | 99.7% |

TABLE 7

Example 5

| Particle size - microns | Particle Removal Efficiency |
|---|---|
| 4 | 50.0% |
| 6 | 66.6% |
| 8 | 84.9% |
| 10 | 93.0% |
| 12 | 96.0% |
| 14 | 97.8% |
| 16 | 98.6% |
| 18 | 99.2% |

Liquid Cartridge Filter Efficiency Measurements

The initial particle removal efficiency measurements are done at a flow rate of 9 cubic meters per hour, using city water filtered to remove substantially all particles 1.5 microns or larger. The filter cartridge to be tested is first flushed for 5 to 10 minutes or until the effluent is substantially free of any particles. Then particles in a slurry are injected.

Particle sizing and counting is done with a Hiac Royco Microcount 05 laser particle sensor. Water is sampled through the sensor continuously at 60 milliliters per minute. A sample switching valve is used to draw liquid alternately from upstream and downstream of the test housing for testing. The entire test system is maintained at a pressure of approximately 2 bar by means of a throttling flow control valve at the final outlet of the system. A slurry of particles in water is prepared using SAE Fine Test Dust (hereinafter "SAE Fines") obtained from Powder Technology Incorporated (PTI). The particle slurry is injected into the main system flow (9 cubic meters per hour) upstream of the test housing. The combined streams pass through a six stage static mixer to insure a homogeneous mixture. The particle injection is started and proceeds for two minutes. Then the sample switching valve is opened to the downstream side of the test housing and particles are counted twice, one minute for each count. If the two counts are substantially the same, upstream sampling is started after a one minute waiting period. Again, two counts, one minute each are done and compared. If the counts are substantially the same, the test is complete and the two results are compared to calculate particle removal efficiency by size.

Over the course of the initial efficiency test the filter is exposed to no more than 5 grams of particulate which has no substantial effect on the filter efficiency, so only initial efficiency is measured.

Terminal efficiency is tested for a liquid filter cartridge at a selected maximum recommended differential pressure or pressure drop. A slurry of SAE Fine dust is fed into a liquid stream that is fed to the filter cartridge until the differential pressure reaches a 2.4 bar terminal pressure drop. The slurry particle concentration is 100 grams per liter and the slurry is supplied at about 180 liters per hour to the main liquid stream of 9 cubic meters per hour. The cartridge loading process takes about 30 minutes. After the cartridge reaches the pre-established terminal pressure drop, the particle feed is stopped but the main liquid stream is continued. The filter is then flushed for 2 to 6 hours until the downstream fine particle count is significantly lowered. When flushing is complete, the last downstream count is saved as a measure of background counts. Then an efficiency test is done (as described above) and the background counts are subtracted when calculating terminal efficiency.

Turbidity Measurements

Turbidity is a measure of the optical clarity of a liquid and were measured using Nephelometric Turbidity Units (NTU).

Turbidity was measured using a Hach model 18900 ratio turbidimeter (selected at 200 NTU full scale at the beginning of the test and manually switched to 20 NTU full scale when the turbidity was in the lower range measured), available from the Hach Corporation. Turbidity was measured continuously downstream of filter cartridges during particle loading. Turbidity was used to measure overall filter performance. If the turbidity suddenly increased this was taken as an indication of a leak or mechanical failure brought on by hydraulic stress.

COUNTEREXAMPLE 6

Figure 3:
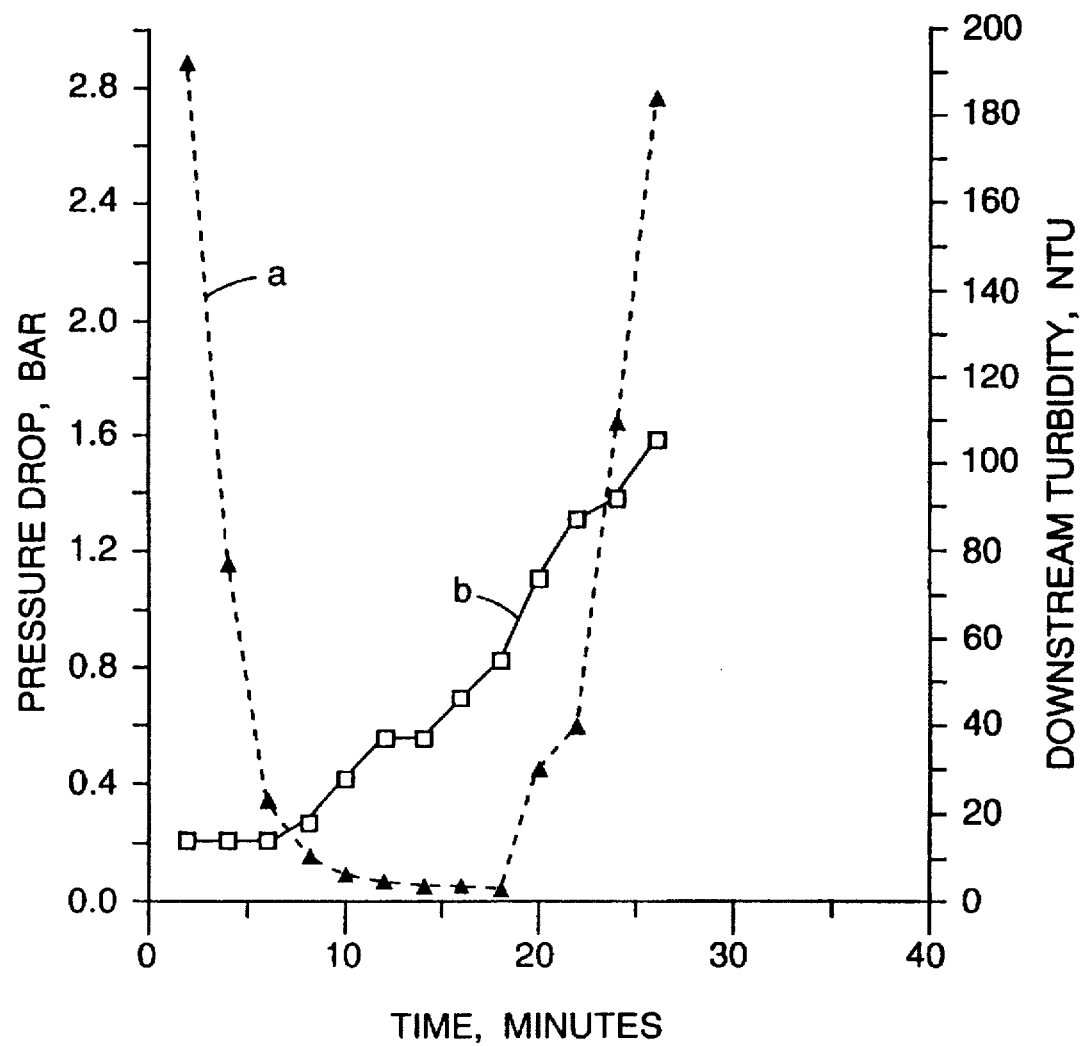
FIG. 3 is a graph of pressure drop and turbidity versus time for a prior art cartridge filter.

An Example 1 filter cartridge was installed in a pressure housing and tested with particle laden water at a flow rate of 9 cubic meters per hour. The test particles were SAE Fine. The concentration of particles in the challenge stream was 2.0 kilograms per cubic meter of water. The turbidity of the challenge water was approximately 660 NTU as measured by the Hach model 18900 ratio turbidimeter after a 10 to 1 dilution. FIG. 3 shows the differential pressure (b) and downstream turbidity (a) as the filter loads with particles. The downstream turbidity (a) dropped rapidly and monotonically for the first 18 minutes. At the 20 minute point, when the differential pressure (b) was 1.1 bar, the downstream turbidity jumped to 30 and continued to increase for the duration of the test. This is an indication of filter rupture brought on by hydraulic stress. The apparent leak got progressively worse as differential pressure increased. Approximately 7.8 kilograms of test particles were fed to the filter over the course of the test.

EXAMPLE 7

A polypropylene Wildcatter™ support core (available from Crellin Corporation) and a molded polypropylene endcap assembly was used to measure pressure drop and particle loading capacity for material wrapped on the core. The core is 91 cm long and 4.6 cm in diameter. The core has about 900 rectangular holes. The inlet dimensions of the holes are about 1.3 cm by 0.25 cm. A layer of polypropylene spunbond material (TYPAR™, 55 gms/m$^2$ basis weight, manufactured by Reemay Corp.), 91 cm wide by 45 cm long, was plied with a layer of filter material C, 91 cm wide by 30 cm long. The leading edge of the spunbond material was heat welded to the core from end to end and the materials were wrapped on the core. The final edge was heat welded to the underlying materials and the core. In this way, the spunbond material forms the innermost and outermost layers with a middle layer of the spunbond material between two layers of filter material C. The core was welded to endcaps and installed in a pressure housing. The assembly was tested with particle, SAE Fine dust, laden water at a flow rate of 9 cubic meters per hour at a particle concentration of 10 gm/m$^3$. Table 8 shows the differential pressure and downstream turbidity as the core assembly is loaded with particles. After two minutes, the downstream turbidity dropped continuously. Even at the very high differential pressure of 2.72 bar the assembly showed no sign of leaking. Approximately 18 grams of test particles were fed to the assembly over the course of the test. Inspection of the assembly after the test showed no sign of physical distortion of the core covering layers.

TABLE 8

| Elapsed Time (Minutes) | Pressure Drop (Bar) | Downstream Turbidity (NTU) |
| --- | --- | --- |
| 1 | 0.14 | 2.7 |
| 2 | 0.14 | 2.8 |
| 3 | 0.14 | 2.8 |
| 4 | 0.14 | 2.8 |
| 5 | 0.21 | 2.8 |
| 6 | 0.21 | 2.8 |
| 8 | 0.28 | 2.6 |
| 9 | 0.34 | 2.5 |
| 10 | 0.75 | 2.2 |
| 11 | 1.9 | 1.6 |
| 12 | 2.72 | 1.2 |

EXAMPLE 8

Filter material C was laminated with layers of the TYPAR™ (55 gms/m$^2$) spunbond material to make a composite laminate with the same layer construction as described in Example 5. A disc of this five (5) layer laminate was tested for particle removal efficiency at a flow rate of 15 liters per minute through a 123 cm$^2$ area of material. This flux rate is similar to the flux rate of 9 cubic meters per hour passing through a cartridge filter core as described in the previous example. The results are shown in Table 9 below.

TABLE 9

| Particle Size (μm) | Particle Removal Efficiency |
| --- | --- |
| 2 | 16.6% |
| 4 | 24.5% |
| 6 | 28.6% |
| 8 | 55.1% |
| 10 | 78.9% |
| 12 | 90.4% |
| 14 | 94.6% |
| 16 | 94.6% |
| 18 | 99.3% |

The particle removal efficiency is significantly less than the efficiency obtained for Example 3 where the liquid flux rate is 150 times less.

EXAMPLE 9

A wrapped core assembly as described in Example 7 was prepared and then used to make a filter cartridge as described in Example 1. The Example 9 filter cartridge was installed in a pressure housing and tested for initial particle removal efficiency as described above. Table 10 below shows the results.

TABLE 10

| Particle Size (μm) | Particle Removal Efficiency |
| --- | --- |
| 1 | 45.1% |
| 2 | 87.9% |

TABLE 10-continued

| Particle Size (μm) | Particle Removal Efficiency |
| --- | --- |
| 3 | 94.3% |
| 4 | 96.7% |
| 5 | 98.5% |
| 6 | 99.5% |

Figure 4:
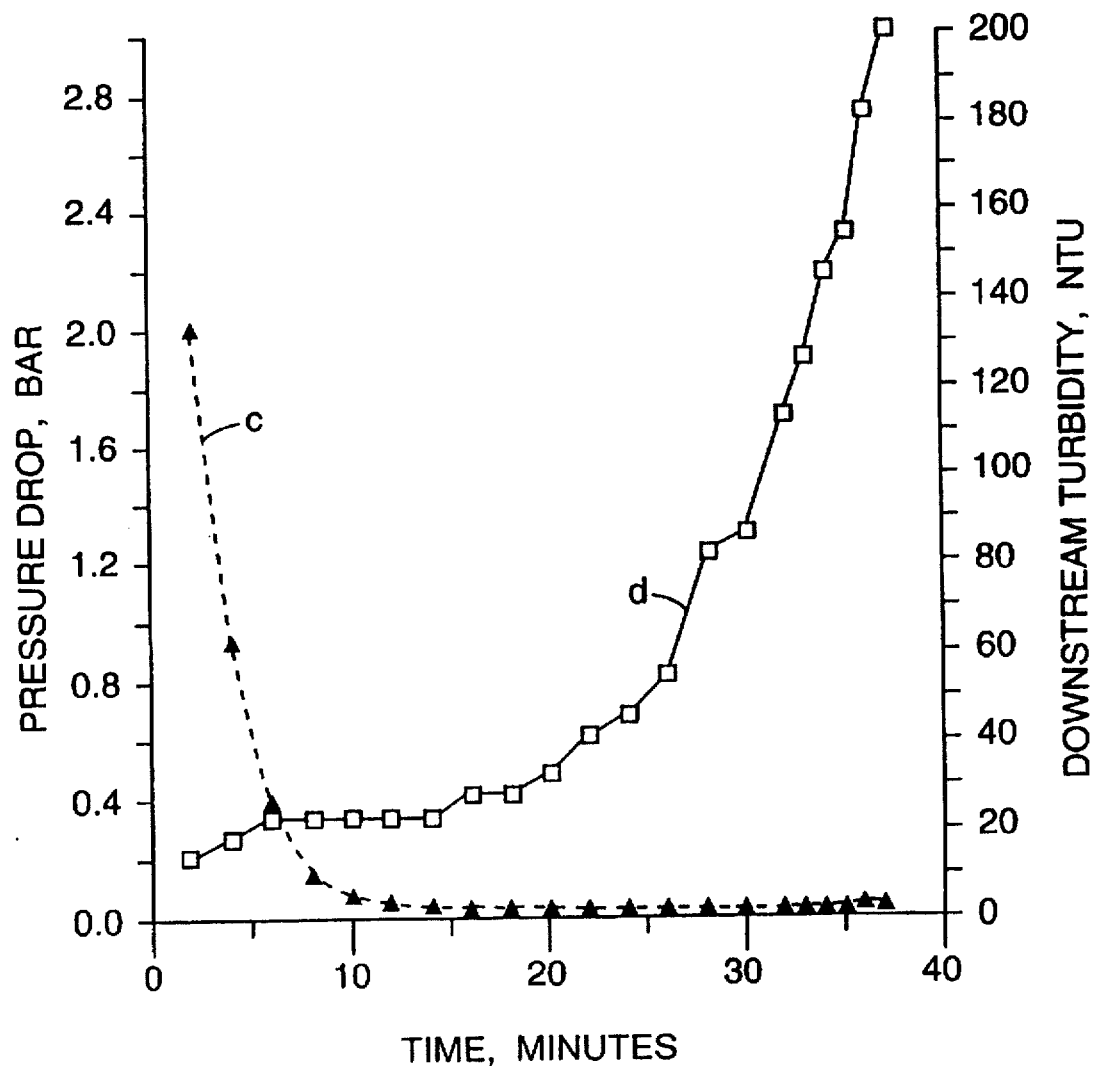
FIG. 4 is a graph of pressure drop and turbidity versus time for an invention cartridge filter.

The Example 9 cartridge filter was then challenged with a suspension of particles as described in Example 1, with turbidity (c) and pressure drop (d) results shown in FIG. 4.

Over the course of this test the cartridge was fed about 9 kilograms of particles. The cartridge was then flushed with clean water for 2.5 hours. The cartridge was then challenged with particles to measure the terminal particle removal efficiency with a terminal differential pressure of about 3.5 bar. Results of the terminal efficiency test are shown below in Table 11.

TABLE 11

| Particle Size (μm) | Particle Removal Efficiency |
| --- | --- |
| 2 | 65.1% |
| 3 | 86.7% |
| 4 | 92.8% |
| 5 | 96.3% |
| 6 | 98.6% |
| 7 | 99.4% |

After the terminal efficiency test, the cartridge was removed from the pressure housing and the pleated filter material was carefully removed without disturbing the core wrap material on the core. Large areas of the core wrap material on the core appeared white, however, several distinct, dark brown stains were seen on the core wrap material, ranging in area from about 3 cm$^2$ to about 30 cm$^2$. Careful inspection of the inner surface of the pleated filter material showed it to be mainly white with a few dark brown spots where holes had formed. Several holes were noted at the inner pleat tips, where the pleat tips rest against the core for support. The brown spots on the material covering the core were formed by particle laden water flowing through leaks in the inner pleat tips.

The material wrapped core and endcap assembly without the pleated filter material was then installed in the pressure housing and tested for pressure drop at 9 cubic meters per hour flow rate. The pressure drop was 0.14 bar, the same as the initial pressure drop in Example 7.

Although the rate of particle feed in this example was the same as for Counterexample 6, the rate of increase of the pressure drop was lower indicating that the material on the core had no effect on the pressure drop.

As can be seen in FIG. 4, the downstream turbidity (c) in this example dropped and remained at 1.8 NTU until 2.18 bar differential pressure was reached. At this point, turbidity briefly rose slightly to 2.9 NTU (indicating some sort of leak) and then fell back to 2.0, even though the pressure drop rose from 2.18 to 2.99 during this period. This would indicate that if a leak had formed it stabilized or sealed almost immediately.

The fact that leaks form during this example was clear from the staining of the material on the core but these leaks were not apparent downstream and there was little decrease in the filter's terminal efficiency and downstream turbidity did not significantly rise during the filter's life time.

EXAMPLE 10

A wrapped core was prepared as described in Example 7, however, using filter material D as the self-sealing material. The wrapped core was formed into a pleated cartridge filter as described in Example 1. The filter cartridge was installed in a pressure housing and tested for initial particle removal efficiency as described above. Table 12 below sets forth the results.

TABLE 12

| Particle Size (μm) | Particle Removal Efficiency |
|---|---|
| 1 | 66.9% |
| 2 | 96.9% |
| 3 | 98.9% |
| 4 | 99.6% |

Figure 5:
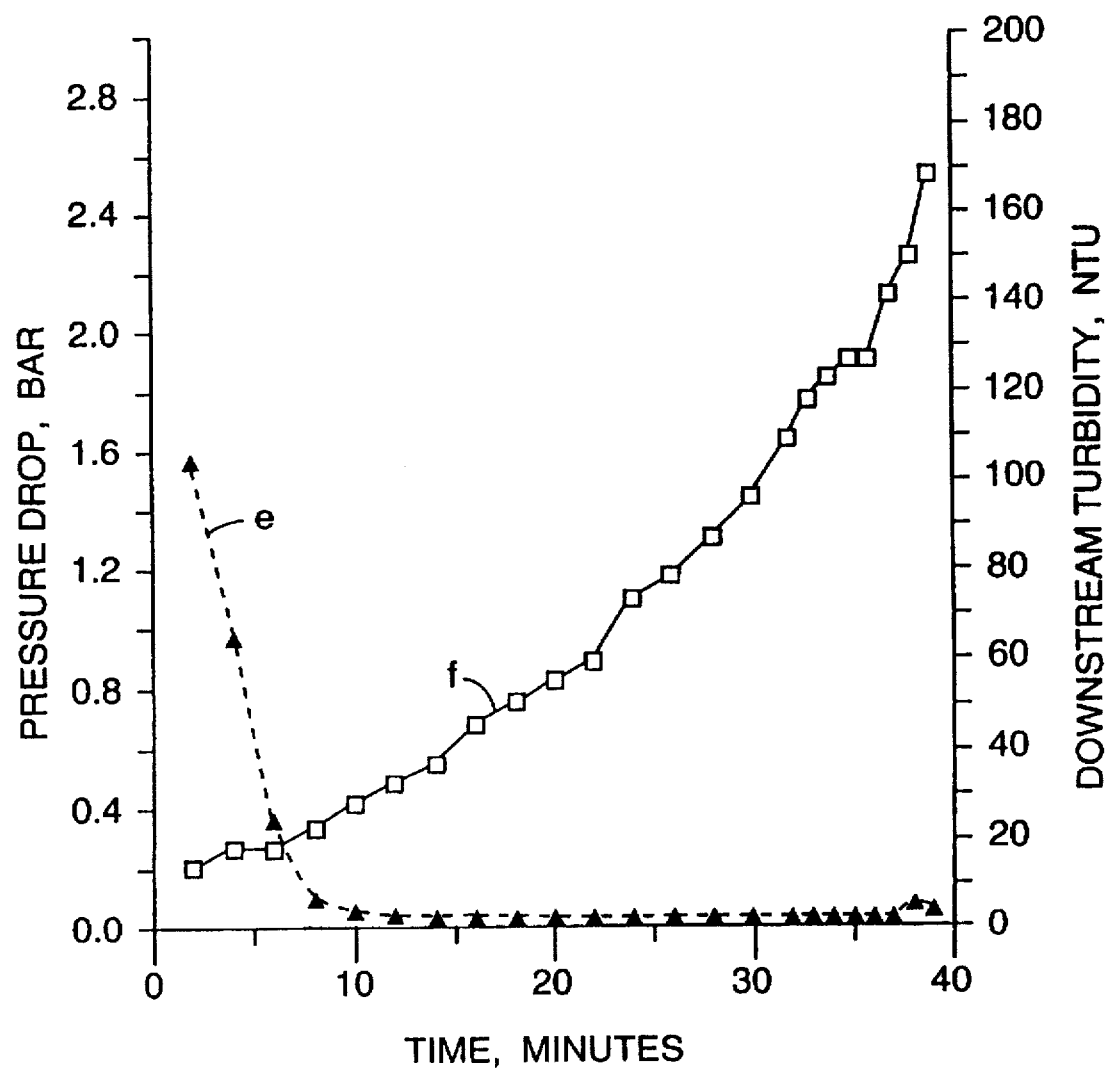
FIG. 5 is a graph of pressure drop and turbidity versus time for an invention cartridge filter.

The cartridge filter was then challenged with a suspension of particles as described in Example 4. The turbidity (e) and pressure drop (f) results are shown in FIG. 5.

Over the course of this test the cartridge filter was fed about 8.5 kilograms of particles. The cartridge was then flushed with clean water to bring down the background counts. The cartridge filter was then challenged with particles to measure the particle removal efficiency by size at elevated differential pressure (about 3.6 bar). Results of the terminal efficiency test are shown below.

TABLE 14

| Particle Size (μm) | Particle Removal Efficiency |
|---|---|
| 2 | 35.5% |
| 3 | 78.8% |
| 4 | 88.2% |
| 5 | 96.0% |
| 6 | 99.2% |

EXAMPLE 11

A sample of filter media E was placed in a 293 mm diameter filter holder. 100 grams of SAE Fine dust was dispersed in 10,000 grams of water and agitated continuously to keep the particles in suspension. This suspension was pumped at 1 liter per minute into the 293 mm filter holder with a peristaltic pump, passing the entire 10,100 gram mixture through the filter. At the end of the test the differential pressure across filter media E was 2.0 bar. This shows that a 293 mm disc of filter media E will survive a 100 gram challenge of SAE Fine dust at 1 liter per minute without exceeding 2.4 bar (typical terminal pressure for pleated filters).

COUNTEREXAMPLE 12

A 293 mm filter disc holder was connected in series with a 47 mm filter disc holder, with a pressure gauge on the inlet to the 293 mm holder and another pressure gauge between the filter holders. The working area diameter of the large filter holder was about 275 mm, giving a working area of 59,396 mm$^2$. The working area diameter of the 47 mm filter holder was about 37 mm, giving a working area of 1075 mm$^2$. The ratio of filter area between the two holders was 55:1, thus the liquid velocity through the media in the small holder was 55 times higher then the velocity through the media in the large holder when they are operated in series. This area and velocity ratio simulates the situation in a pleated cartridge filter when a self-sealing core wrap material is wrapped on the core downstream of the pleated filter material.

A sample of filter media E was placed in the 293 mm filter holder. A sample of filter media A was placed in the 47 mm filter holder. Five grams of SAE Fine dust was dispersed in 10,000 grams of water and agitated continuously to keep the particles in suspension. This suspension was pumped at 1 liter per minute into the filter holders with a peristaltic pump. When 510 milliliters of water had passed through the 47 mm filter holder, the pressure drop across the 47 mm holder reached 2.4 bar and the test was terminated. Based on the volume of water passed through the filter holders and the concentration of particles in the challenge suspension, filter media A plugged when only 0.25 grams of particles were fed to the filter holders. This shows that a material like filter media A (mean flow pore size 9 μm) is not suitable for use as a self-sealing layer downstream of filter media E (mean flow pore size 34 μm) because filter media A was almost immediately plugged with particles passing through filter media E.

EXAMPLE 13

A 293 mm filter disc holder was connected in series with a 47 mm filter disc holder, with a pressure gauge on the inlet to the 293 mm holder and another pressure gauge between the filter holders. The working diameter of the large filter holder was about 275 mm, giving a working area of 59,396 mm$^2$. The working area diameter of the 47 mm filter holder was about 37 mm, giving a working area of 1075 mm$^2$. The ratio of filter area between the two holders is 55:1, thus the liquid velocity through the media in the small holder is 55 times higher than the liquid velocity through the media in the large holder when they are operated in series. This area and velocity ratio simulates the situation in a pleated cartridge filter when a self-sealing core wrap material is wrapped on the core downstream of the pleated filter material.

A sample of filter media E was placed in the 293 mm filter holder. A sample of filter media F was placed in the 47 mm filter holder. Five grams of SAE Fine dust was dispersed in 10,000 grams of water and agitated continuously to keep the particles in suspension. This suspension was pumped at 1 liter per minute into the filter holders with a peristaltic pump. When 2000 milliliters of water had passed through the 47 mm filter holder, the pressure drop across the 47 mm holder reached 2.4 bar and the test was terminated. Based on the volume of water passed through the filter holders and the concentration of particles in the challenge suspension, filter media F plugged when only 1.0 gram of particles were fed to the filter holders. This shows that a material like filter media F (mean flow pore size 26 μm) is generally not suitable for use as a self-sealing layer downstream of filter media E (mean flow pore size 34 μm) because filter media F almost immediately plugged with particles passing through filter media E.

We claim:

1. A liquid filter for filtering particles from a liquid said filter comprising a pleated filter material having upstream and downstream pleat tips each pair of upstream and downstream pleat tips being separated by a planar pleat section of the filter material, where the filter material has upstream faces and downstream faces, the upstream pleat tips forming an upstream face of the filter and the downstream pleat tips forming a downstream face of the filter where at least on the downstream face of the filter there is provided a rigid porous support structure, the upstream and downstream faces of the filter material on mutually abutting pairs of planar pleat sections between adjacent upstream and downstream pleat tips are separated by 6 mm or less on average, the downstream face of the filter being in substantially continuous contact with a porous self-sealing fibrous cover layer which self-sealing fibrous cover layer is coplanar with and in substantially continuous contact with the rigid porous support structure and which self-sealing fibrous cover layer performs essentially no filtering function.

2. The liquid filter of claim 1 wherein the filter is a cartridge filter and the pleated filter material and support structure are annular.

3. The liquid filter of claim 1 wherein the pleated filter material and support structure are planar.

4. The liquid filter of claim 2 wherein the pleated filter material has radial pleats.

5. The liquid filter of claim 2 wherein the pleated filter material has radial pleats and the support structure has substantially linear extents in the direction transverse to the radial pleats.

6. The liquid filter of claim 5 wherein the pleated filter material has radial pleats and the support structure has substantially parallel extents in the direction transverse to the radial pleats.

7. The liquid filter of claim 5 wherein the self-sealing fibrous cover layer is coextensive with the support structure and has a Mean Flow Pore Size (MFPS) greater than the MFPS of the filter material.

8. The liquid filter of claim 7 wherein the self-sealing fibrous cover layer has a MFPS of greater than 20 percent, but less than 200 percent greater, that the MFPS of the filter material.

9. The liquid filter of claim 7 wherein the rigid support structure has a pressure-drop of less than 0.1 bar at 9 m³/hr liquid flow and an open area of at least 5 percent.

10. The liquid filter of claim 1 wherein the pleated filter material comprises a melt-blown nonwoven web of thermoplastic fibers.

11. The liquid filter of claim 1 wherein the pleated filter material comprises a laminate having at least one filter layer and an additional layer.

12. The liquid filter of claim 11 wherein the additional layer is a support layer.

13. The liquid filter of claim 12 wherein the support layer is a spunbond nonwoven web.

14. The liquid filter of claim 7 wherein the filter material is a continuous annular filter material.

15. The liquid filter of claim 1 wherein the filter material has a basis weight of about 10 to 300 g/m².

16. The liquid filter of claim 15 wherein the filter material has a basis weight of about 20 to 150 g/m².

17. The liquid filter of claim 1 wherein the pleated filter material comprises a laminate having a fluid distribution layer formed of fibers being from 10 to 10,000 denier and the fluid distribution layer having a thickness of from 0.1 to 2.0 mm.

18. The liquid filter of claim 17 wherein the fluid distribution layer is formed of fibers being from 20 to 600 denier and the fluid distribution layer having a thickness of from 0.2 to 1.0 mm and will compress by less than 20 percent at 2.5 bar pressure at 9 m³/hr liquid flow.

19. The liquid filter of claim 1 wherein the cover layer comprises a fibrous nonwoven material.

20. The liquid filter of claim 19 wherein the cover layer has less than 1/50 the surface area of the pleated filter material.

21. The liquid filter of claim 20 wherein the cover layer has a tensile strength of at least 10 Newtons.

22. The liquid filter of claim 21 wherein the cover layer has a tensile strength of at least 30 Newtons.

23. The liquid filter of claim 19 wherein the cover layer is a laminate of a nonwoven filter material and a support layer.

24. The liquid filter of claim 1 wherein the pleated filter material has a thickness of from 0.05 to 2 mm.

25. The liquid filter of claim 1 wherein the pleated filter material has a thickness of from 0.2 to 0.5 mm.

26. The liquid filter of claim 1 wherein the porous support structure has at least 20 percent discrete open areas.

27. The liquid filter of claim 1 wherein the pleated filter material comprises a laminate.

* * * * *